(12) United States Patent
Sakurai

(10) Patent No.: US 9,645,771 B2
(45) Date of Patent: May 9, 2017

(54) INFORMATION PROCESSING APPARATUS, NON-TRANSITORY COMPUTER READABLE MEDIUM, AND MOBILE APPARATUS CONTROL SYSTEM FOR INSTRUCTING A MOBILE IMAGE FORMING APPARATUS TO MOVE TO A SOURCE OF A PRINT REQUEST AND PERFORM PRINTING

(71) Applicant: FUJI XEROX CO., LTD., Minato-ku, Tokyo (JP)

(72) Inventor: Yasuharu Sakurai, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/553,388

(22) Filed: Nov. 25, 2014

(65) Prior Publication Data

US 2015/0378652 A1    Dec. 31, 2015

(30) Foreign Application Priority Data

Jun. 30, 2014 (JP) ................................ 2014-134566

(51) Int. Cl.
*G06F 3/12* (2006.01)
*H04N 1/00* (2006.01)
*G06K 15/00* (2006.01)

(52) U.S. Cl.
CPC ............ *G06F 3/1204* (2013.01); *G06F 3/126* (2013.01); *G06F 3/1208* (2013.01); *G06F 3/1292* (2013.01); *G06K 15/40* (2013.01); *H04N 1/00204* (2013.01); *H04N 1/00307* (2013.01); *H04N 2201/0094* (2013.01); *H04N 2201/0096* (2013.01)

(58) Field of Classification Search
None
See application file for complete search history.

(56) References Cited

U.S. PATENT DOCUMENTS

2009/0043502 A1*  2/2009  Shaffer ................... G01C 21/20
                                                          701/469

FOREIGN PATENT DOCUMENTS

| JP | 2001-125646 A |   | 5/2001 |
|----|---------------|---|--------|
| JP | 2006-092361 A |   | 4/2006 |
| JP | 2006092361 A  | * | 4/2006 |
| JP | 2006-321583 A |   | 11/2006 |
| JP | 2006321583 A  | * | 11/2006 |

* cited by examiner

*Primary Examiner* — Andrew H Lam
(74) *Attorney, Agent, or Firm* — Sughrue Mion, PLLC

(57) ABSTRACT

An information processing apparatus includes a receiving unit that receives a print request with respect to a mobile image forming apparatus, and an instructing unit that instructs the mobile image forming apparatus to move to a request source of the print request and perform printing if the instructing unit determines that the request source is in motion, on the basis of a temporal change of location information indicating a location of the request source.

6 Claims, 8 Drawing Sheets

FIG. 4

| JOB NO. | CARD ID | DOCUMENT ID |
|---|---|---|
| 1 | 003 | 1001 |
| 2 | 007 | 1002 |
| 3 | – | – |
| 4 | – | – |
| 5 | – | – |

FIG. 5

| COMMUNICATION ID | X-COORDINATE | Y-COORDINATE | ELAPSED TIME |
|---|---|---|---|
| 82-9B | 3.1 m | 2.5 m | 300 sec |
| 38-42 | 5.7 m | 1.1 m | 10 sec |

INFORMATION PROCESSING APPARATUS, NON-TRANSITORY COMPUTER READABLE MEDIUM, AND MOBILE APPARATUS CONTROL SYSTEM FOR INSTRUCTING A MOBILE IMAGE FORMING APPARATUS TO MOVE TO A SOURCE OF A PRINT REQUEST AND PERFORM PRINTING

CROSS-REFERENCE TO RELATED APPLICATIONS

This application is based on and claims priority under 35 USC 119 from Japanese Patent Application No. 2014-134566 filed Jun. 30, 2014.

BACKGROUND

Technical Field

The present invention relates to an information processing apparatus, a non-transitory computer readable medium, and a mobile apparatus control system.

SUMMARY

According to an aspect of the invention, there is provided an information processing apparatus including: a receiving unit that receives a print request with respect to a mobile image forming apparatus; and an instructing unit that instructs the mobile image forming apparatus to move to a request source of the print request and perform printing if the instructing unit determines that the request source is not in motion, on the basis of a temporal change of location information indicating a location of the request source.

BRIEF DESCRIPTION OF THE DRAWINGS

Exemplary embodiments of the present invention will be described in detail based on the following figures, wherein:

FIG. 4 is a schematic diagram showing an example of the configuration of print request information;

FIG. 5 is a schematic diagram showing an example of the configuration of card location information;

DETAILED DESCRIPTION

Exemplary Embodiment

Configuration of Image Forming System

Figure 1:
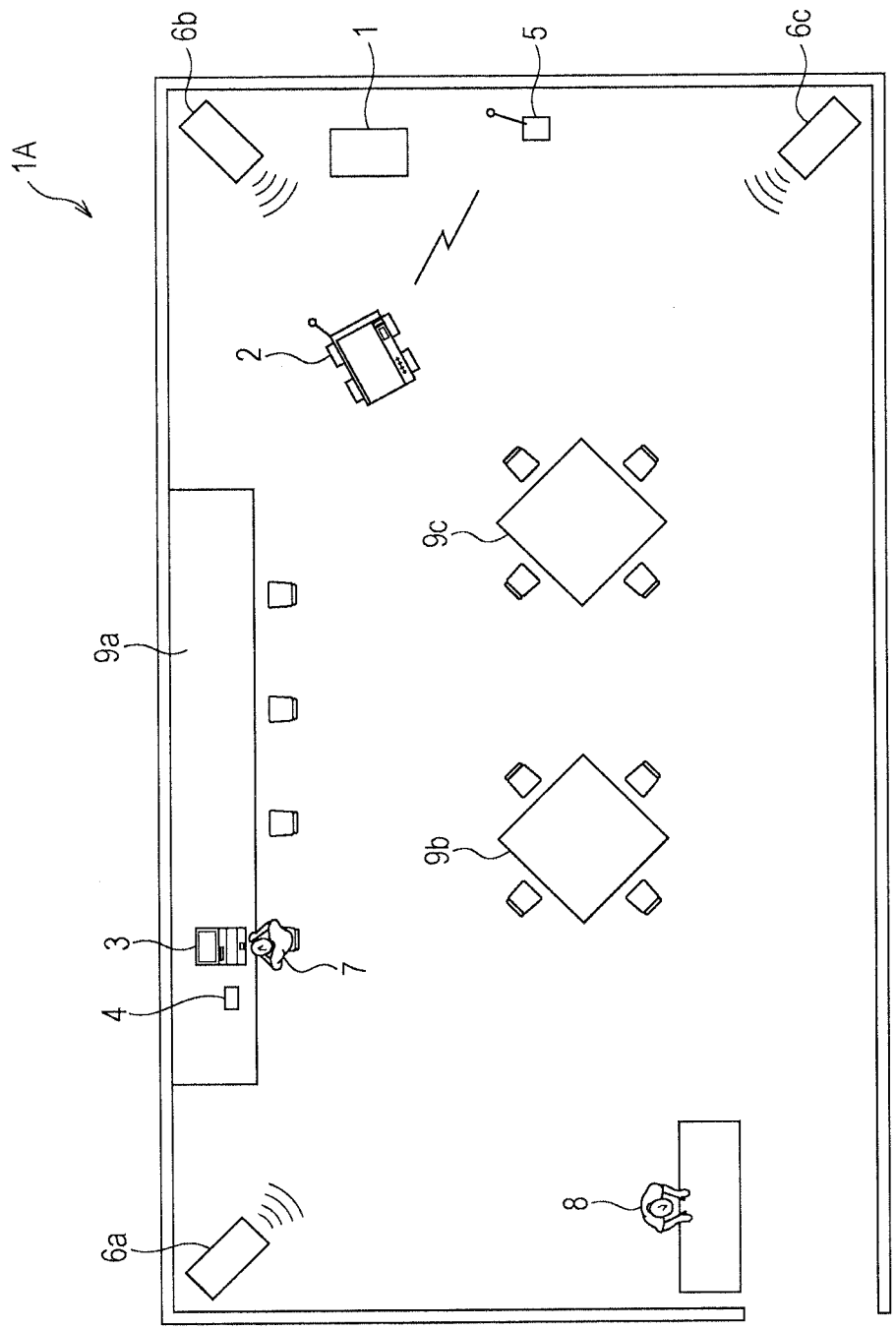
FIG. 1 is a schematic diagram showing an example of the configuration of an information forming system according to an exemplary embodiment.
Figure 10:
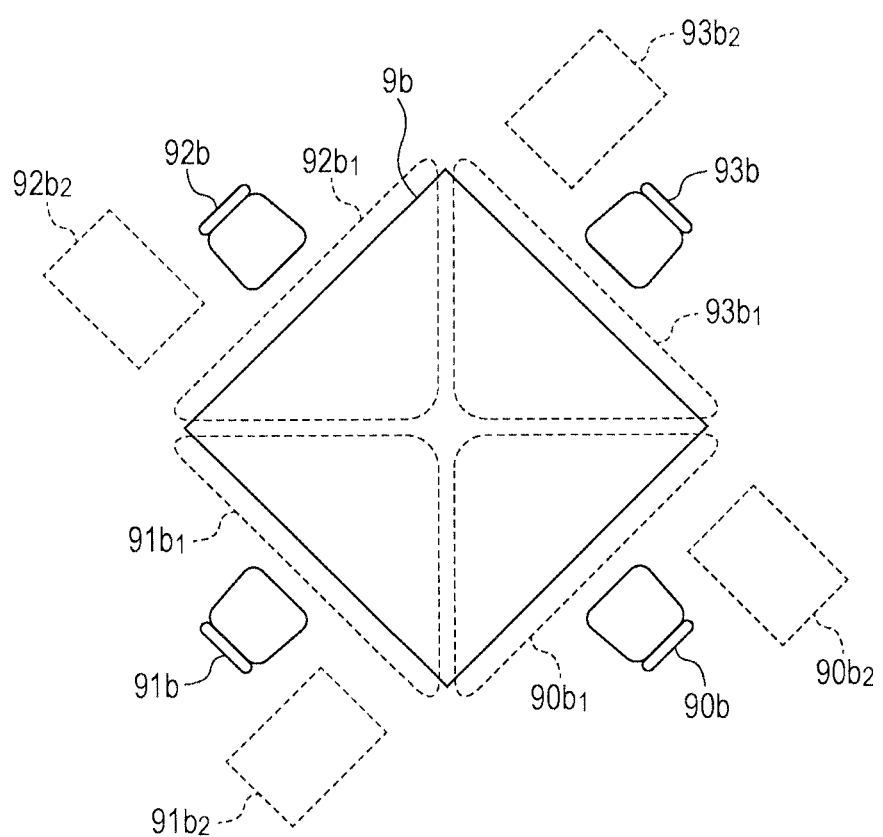
FIG. 10 is a schematic diagram showing an example of the behavior of the mobile image forming apparatus according to the exemplary embodiment.

FIG. 1 is a schematic diagram showing an example of the configuration of an image forming system 1A according to an exemplary embodiment. FIG. 10 is a schematic diagram showing an example of the behavior of a mobile image forming apparatus 2 according to the exemplary embodiment.

The image forming system 1A is an example of a mobile apparatus control system, and is installed in a facility such as an office in which the seat of a user 7 is not assigned in advance, a shared office, and a coffee shop. The image forming system 1A includes an information processing server 1, the mobile image forming apparatus 2, and a terminal apparatus 3 which are connected to each other for communication through a radio router 5 that forms a network. The information processing server 1 is connected to sensors 6a through 6c with a cable or wirelessly, and detects the location of a card 4 carried by the user 7. In this exemplary embodiment, the information processing server 1 is installed inside the facility. However, it is obvious that the information processing server 1 may be installed outside the facility. In FIG. 1, only one mobile image forming apparatus 2 and only one terminal apparatus 3 are illustrated. However, plural mobile image forming apparatuses 2 and plural terminal apparatuses 3 may be connected. Further, there may be plural cards 4 and plural users 7.

In the facility, plural tables 9a through 9c are installed. When the user 7 carrying the terminal apparatus 3 enters the facility, the user 7 receives the card 4 at a front desk 8. Then, for example, the user 7 takes a seat at the table 9a, places the card 4 on the table 9a, and works on the terminal apparatus 3.

The information processing server 1 is an information processing apparatus, and includes electronic components such as a central processing unit (CPU) having a function for processing information and a flash memory. The information processing server 1 receives a print request from the terminal apparatus 3, and transmits a print instruction to the mobile image forming apparatus 2. Further, the information processing server 1 receives detection signals from the sensors 6a through 6c, calculates the location of the card 4 as location information, and transmits the location information together with the print instruction to the mobile image forming apparatus 2.

The mobile image forming apparatus 2 is a printer having at least a print function. The mobile image forming apparatus 2 may be a multifunction apparatus having a scanner function, a copier function, and a facsimile function, in addition to a print function. Further, the mobile image forming apparatus 2 includes electronic components such as a CPU having a function for processing information and a non-volatile memory. The mobile image forming apparatus 2 further includes a carriage unit for moving around the facility. Thus, upon receiving a print instruction and location information from the information processing server 1, the mobile image forming apparatus 2 moves to the location of the card 4 by travelling on the route set by the mobile image forming apparatus 2, and performs printing.

Note that moving to the location of the card 4 may also mean detecting a table on which the card 4 is placed and moving to a location convenient for the user 7 seated at the table. For example, as illustrated in FIG. 10, in the case of a workspace such as a studio where tables and chairs may be freely arranged, the mobile image forming apparatus 2 detects the location of the card 4, and sets as the destination the location which is close to the detected location and in which there is no obstacle. For example, if the card 4 is located in an area $90b_1$ on the table $9b$, a location $90b_2$ next to a chair $90b$ is set as the destination while avoiding the locations of the table $9b$ and the chair $90b$ which are obstacles. Similarly, if the card 4 is located in an area $91b_1$, a location $91b_2$ is set as the destination. If the card 4 is located in an area $92b_1$, a location $92b_2$ is set as the destination. If the card 4 is located in an area $93b_1$, a location $93b_2$ is set as the destination. This prevents the mobile image forming apparatus 2 from bumping into the table or the like.

The terminal apparatus 3 is an information processing apparatus such as a multifunction mobile phone, a tablet terminal, and a personal computer (PC). The terminal apparatus 3 includes, in its body, electronic components such as a CPU having a function for processing information and a flash memory. The terminal apparatus 3 transmits a print request to the information processing server 1 via the network in accordance with an operation by the user 7.

Each of the information processing server 1, the mobile image forming apparatus 2, and the terminal apparatus 3 may perform some of the functions of the other apparatuses. That is, the functions executed by the information processing server 1, the mobile image forming apparatus 2, and the terminal apparatus 3 are assigned to the respective apparatuses for illustrative purposes, and this exemplary embodiment may be modified such that the functions executable by the other apparatuses are executed by the other apparatuses.

The card 4 performs two-way communication with or transmits a one-way signal to the sensors 6a through 6c, using a communication protocol such as Wi-Fi and Bluetooth (registered trademark), for example. The card 4 is assigned an ID so as to be uniquely identified even when there are plural cards 4. Note that the terminal apparatus 3 may have the function equivalent to the card 4. In this case, the ID of the terminal apparatus 3 is registered in advance in the information processing server 1, for example, so as to realize the function of the card 4.

The network formed by the radio router 5 is a communication network that enables high-speed communication, and is a private wireless network such as an intranet and a local area network (LAN), for example. In this exemplary embodiment, a private wireless communication network is used for security purposes. However, a public wireless network may be used.

Each of the sensors 6a through 6c detects the distance to the card 4 by communicating with the card 4 or by receiving a signal from the card 4, and transmits information on the distance to the information processing server 1. Then, the information processing server 1 calculates the location of the card 4 on the basis of the distance. In this exemplary embodiment, a so-called triangulation method is used for calculating the location of the card 4, and therefore at least three sensors 6a through 6c are needed. The location of the card 4 may be recognized using other location detection techniques such as the Global Positioning System (GPS). In this case, it is not always necessary to have three sensors. In this exemplary embodiment, the sensors 6a through 6c communicate with the card 4 at regular time intervals, and recognize the location of the card 4 at those time points.

(Configuration of Information Processing Server)

Figure 2:
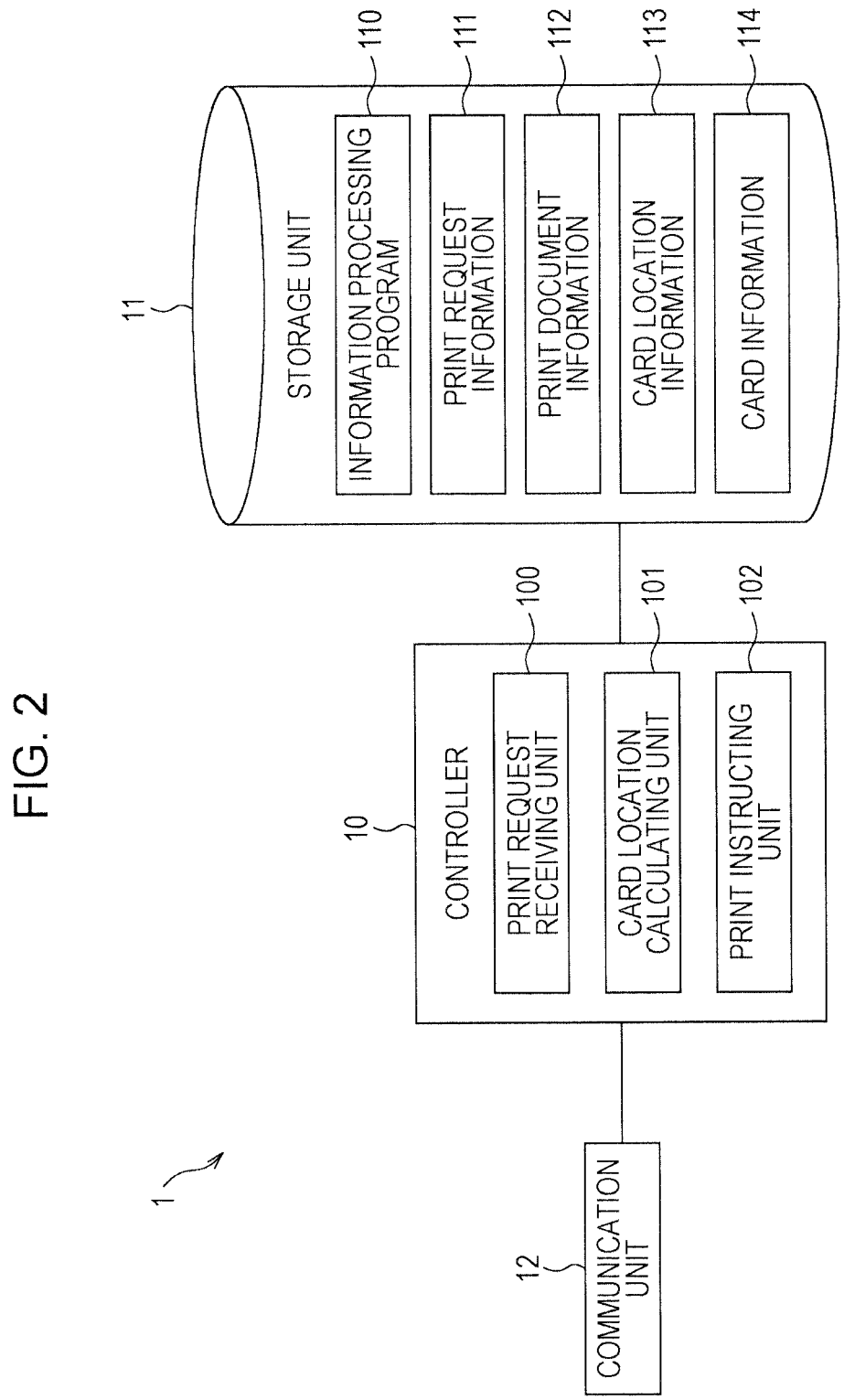
FIG. 2 is a block diagram showing an example of the configuration of an information processing server according to the exemplary embodiment.

FIG. 2 is a block diagram showing an example of the configuration of the information processing server 1 according to this exemplary embodiment.

The information processing server 1 includes a controller 10 including a CPU and configured to perform various types of programs; a storage unit 11 including a storage medium such as a flash memory and configured to store information; and a communication unit 12 configured to communicate with the outside via the network.

The controller 10 executes an information processing program 110 (described below), and thereby functions as a print request receiving unit 100, a card location calculating unit 101, a print instructing unit 102, and so on.

The print request receiving unit 100 receives a print request from the terminal apparatus 3 via the network. More specifically, the print request receiving unit 100 receives from the terminal apparatus 3 a print request and print document information 112 to be printed, writes the print request into print request information 111, and stores the print document information 112 in the storage unit 21.

The card location calculating unit 101 calculates the location of the card 4 in the facility on the basis of the distance to the card 4 detected by each of the sensors 6a through 6c, and stores the calculated location as card location information 113 in the storage unit 11. In the case where the card location information 113 is already calculated by an external apparatus, an acquiring unit that acquires the card location information 113 may be provided.

The print instructing unit 102 instructs the mobile image forming apparatus 2 to perform printing on the basis of the print request information 111, the print document information 112, the card location information 113, and the card information 114.

The storage unit 11 stores the information processing program 110 that causes the controller 10 to function as the above-described units 100 through 102; the print request information 111; the print document information 112; the card location information 113; card information 114; and so on.

The card information 114 is information for identifying the card 4.

(Configuration of Mobile Image Forming Apparatus)

Figure 3:
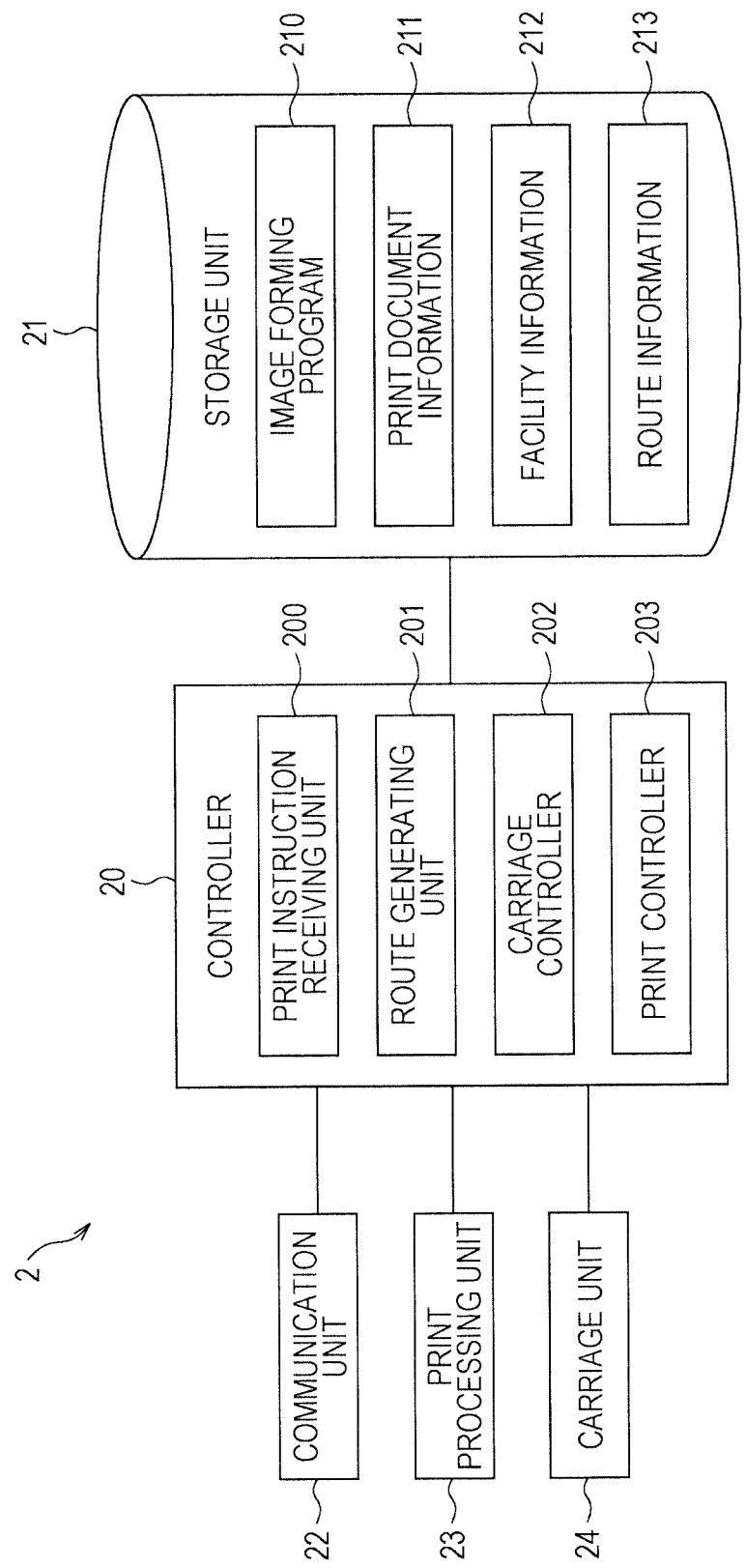
FIG. 3 is a block diagram showing an example of the configuration of a mobile image forming apparatus according to the exemplary embodiment.

FIG. 3 is a block diagram showing an example of the configuration of the mobile image forming apparatus 2 according to this exemplary embodiment.

The mobile image forming apparatus 2 includes a controller 20 including a CPU and configured to perform various types of programs; a storage unit 21 including a storage medium such as a flash memory and configured to store information; a communication unit 22 configured to communicate with the outside via the network; a print processing unit 23 configured to perform print processing on the basis of a print request; and a carriage unit 24 provided for moving around the facility and including wheels and a motor for driving the wheels.

The controller 20 executes an image forming program 210 (described below), and thereby functions as a print instruction receiving unit 200, a route generating unit 201, a carriage controller 202, a print controller 203, and so on.

The print instruction receiving unit 200 receives from the information processing server 1 a print instruction and the print document information 112 to be printed, and stores the print document information 112 as print document information 211 in the storage unit 21.

The route generating unit 201 generates a route on which the mobile image forming apparatus 2 moves on the basis of the card location information 113 included in the print instruction and facility information 212, and stores the route as route information 213.

The carriage controller 202 controls the carriage unit 24 on the basis of the route information 213 generated by the route generating unit 201, and thereby moves the mobile image forming apparatus 2 to the location where the card 4 is present.

When the mobile image forming apparatus 2 reaches the location where the card 4 as the source of the print request is present, the print controller 203 accepts authentication or the like of the user 7 using the card 4, and controls the print processing unit 23 to perform printing.

The storage unit 21 stores the image forming program 210 that causes the controller 20 to function as the above-described units 200 through 203; the print document information 211; the facility information 212; the route information 213; and so on. The facility information 212 is information indicating the layout of the tables 9a through 9c in the facility, routes that may be used by the mobile image forming apparatus 2, the width of the routes, and so on.

FIG. 4 is a schematic diagram showing an example of the configuration of the print request information 111.

The print request information 111 is information created on the basis of the print request received by the print request receiving unit 100, and includes the following items: the job number indicating the order of print among multiple print requests, a card ID indicating the identification information of the card 4, and a document ID indicating the identification information of the print document information. Other than these items, the print request information 111 may further include information on print settings, such as the number of copies; single-sided/double-sided; post-processing such as stapling; and the job name.

FIG. 5 is a schematic diagram showing an example of the configuration of the card location information 113.

The card location information 113 is information indicating the location of the card 4, and includes a communication ID of the card for identifying the card 4 upon performing communication, the X-coordinate and the Y-coordinate on the floor of the facility viewed from the above, and elapsed time indicating the period of time for which the card 4 is remaining in the location without moving.

Figure 6:
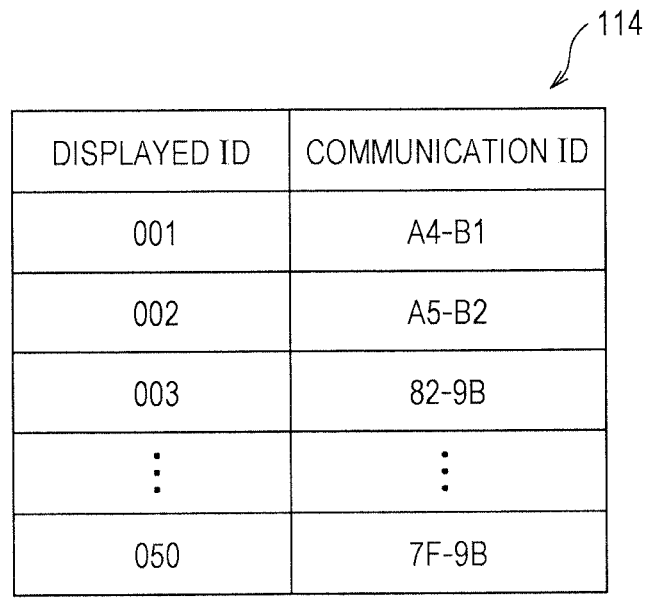
FIG. 6 is a schematic diagram showing an example of the configuration of card information.

FIG. 6 is a schematic diagram showing an example of the card information 114.

The card information 114 includes a displayed ID on the surface of the card 4, and the communication ID of the card for identifying the card 4 upon performing communication.

Figure 7:
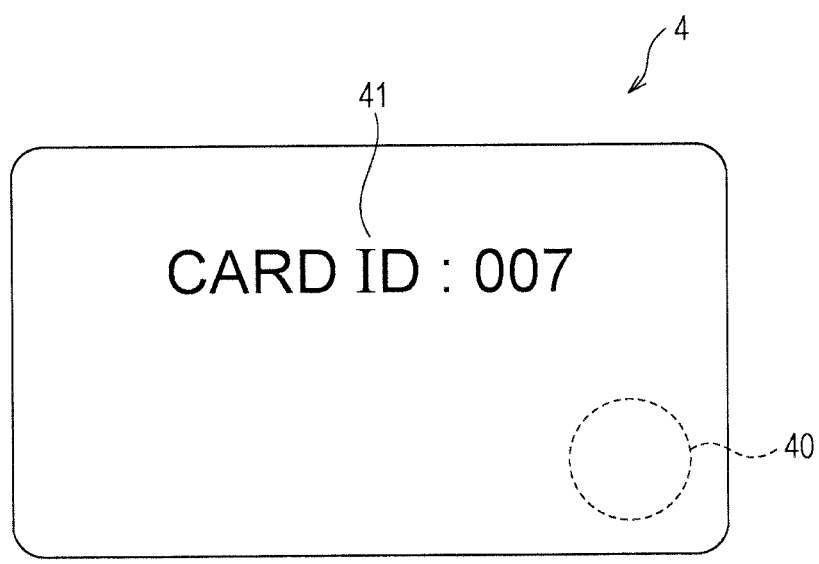
FIG. 7 is a schematic diagram showing an example of the configuration of a card.

FIG. 7 is a schematic diagram showing an example of the configuration of the card 4.

The card 4 includes a displayed ID 41 indicated on its surface by printing or the like, and a communication unit 40 configured to communicate with the sensors 6a through 6c. The communication unit 40 includes an antenna and an IC, and is embedded inside the card 4. The displayed ID 41 corresponds to the card ID of the print request information 111 of FIG. 4.

(Operations of Image Forming System)

The following describes the operations of this exemplary embodiment in terms of (1) print request receiving operation, (2) print instruction operation, (3) card location calculation operation, (4) operations of mobile image forming apparatus, and (5) print request information updating operation.

Figure 8:
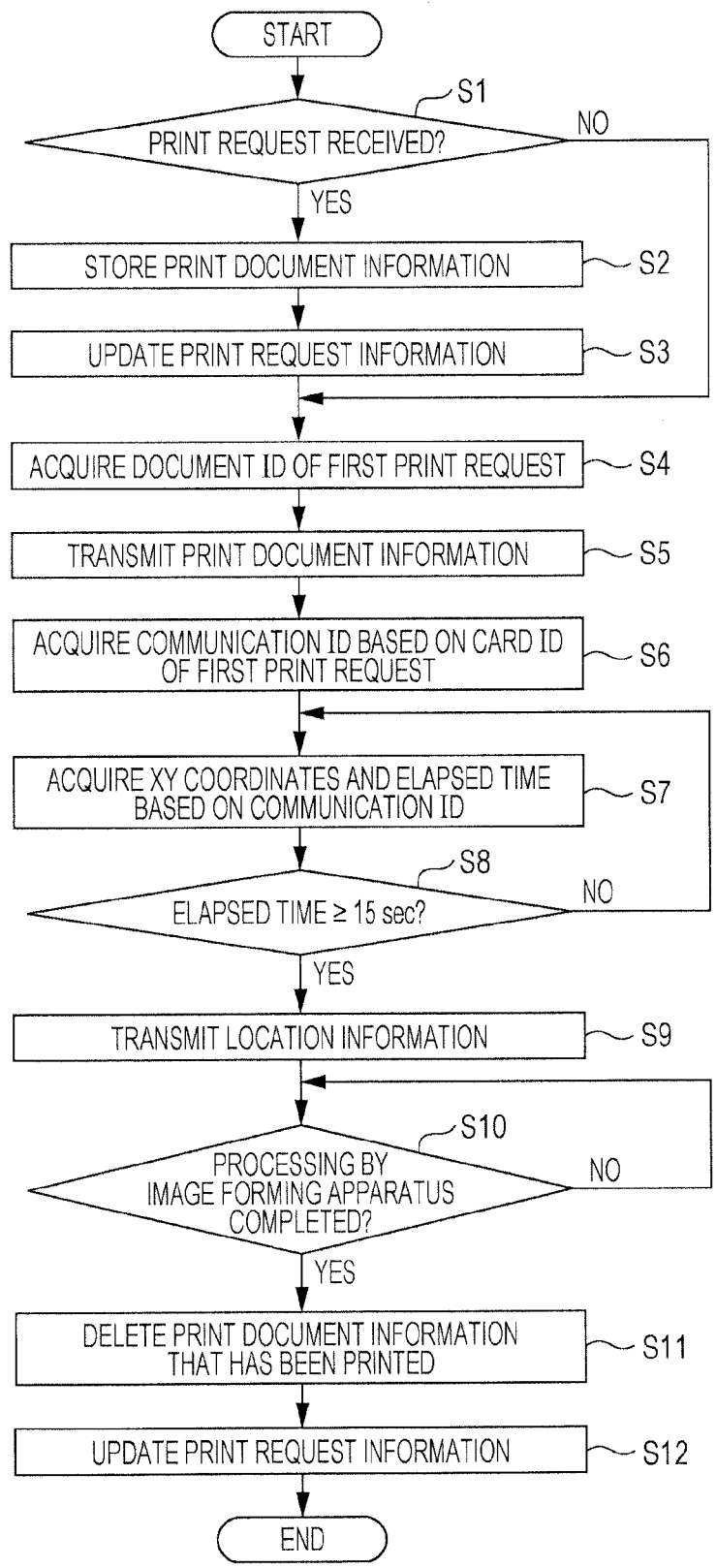
FIG. 8 is a flowchart showing an example of operations of the information processing server.

FIG. 8 is a flowchart showing an example of operations of the information processing server 1.

(1) Print Request Receiving Operation

First, when entering the facility, the user 7 receives the card 4 at the front desk 8, and takes a seat at the table 9a.

Then, the user 7 operates the terminal apparatus 3 so as to select desired document information, enters the displayed ID 41 on the surface of the card 4, and thus requests printing. In this step, the user 7 specifies the print settings such as the number of copies, single-sided/double-sided, monochrome/color, and the like.

The terminal apparatus 3 transmits the print request together with the selected document information to the information processing server 1. Further, when transmitting the print request, the terminal apparatus 3 reports the displayed ID 41 on the surface of the card 4 to the information processing server 1. One way to report the displayed ID 41 may be to include the ID number of the displayed ID 41 in the address used for accessing the information processing server 1. Another way to report the displayed ID 41 may be to select or enter the ID number on the UI screen after connecting to the information processing server 1.

Then, the print request receiving unit 100 of the information processing server 1 receives the print document information to be printed and the print request from the terminal apparatus 3 (S1), stores the print document information 112 in the storage unit 11 (S2), and updates the print request information 111 of FIG. 4 by writing a new job number, the card ID, and the document ID thereto (S3).

(2) Print Instruction Operation

The print instructing unit 102 acquires a document ID "1001" of a job number "1", that is, the first print request of the print request information 111 (S4), and transmits the print document information 112 of the document ID "1001" to the mobile image forming apparatus 2 (S5).

Then, on the basis of a card ID "003" of the job number "1", the print instructing unit 102 refers to the card information 114 of FIG. 6 and acquires a communication ID "82-9B" (S6). Further, on the basis of the communication ID "82-9B", the print instructing unit 102 refers to the card location information 113 of FIG. 5 and acquires the XY coordinates "3.1 m, 2.5 m" and the elapsed time "300 sec" (S7).

Since the acquired elapsed time "300 sec" is equal to or greater than 15 seconds (S8; Yes), the print instructing unit 102 transmits the XY coordinates "3.1 m, 2.5 m" as location information to the mobile image forming apparatus 2 (S9), and thus directs printing. This is because, if the card 4 is remaining in the same location for 15 seconds or longer, then the user 7 of the card 4 as the source of the print request is assumed to be working in the location, and if not, then the user 7 is assumed to be in motion. Thus, for example, in the case where the user 7 moves from their seat to another seat immediately after requesting printing, the mobile image forming apparatus 2 is prevented from moving to the original seat instead of moving to the other seat. Note that the 15 seconds is an example, and the administrator may set an arbitrary period of time. In this exemplary embodiment, the determination is made on the basis of the elapsed time. However, even if the user 7 is in motion, in the case where the moving range is, for example, one meter or less and the user 7 is assumed to be remaining in substantially one location, the location information may be transmitted.

As in the case of the communication ID "38-42" of the card location information 113 of FIG. 5 of which elapsed time is "10 sec", if the acquired elapsed time is less than 15 seconds (S8; No), the print instructing unit 102 assumes that the user 7 of the card with the corresponding card ID is in motion. Thus, the print instruction unit 102 waits until the elapsed time becomes equal to or greater than 15 seconds, without directing printing.

Note that if the acquired elapsed time is less than 15 seconds, the print instructing unit 102 may increment the job number of the print request being processed by one or change the job number to the last number so as to put off printing, and may process the print request of the next job number. This is because if printing is put off, the period of time (elapsed time) during which the user 7 corresponding to the postponed job is seated may become equal to or greater than 15 seconds while another job is being printed.

Further, even if the acquired elapsed time is equal to or greater than 15 seconds, in the case where the card 4 is located in a place not appropriate for performing printing, such as a restroom, the print instructing unit 102 performs the same operation as that performed in the case where the user 7 is assumed to be in motion. That is, the print instructing unit 102 increments the job number of the print request or changes the job number to the last number so as to put off printing, and suspends print processing until the user 7 returns to their seat from the restroom.

(3) Card Location Calculation Operation

Figure 9:
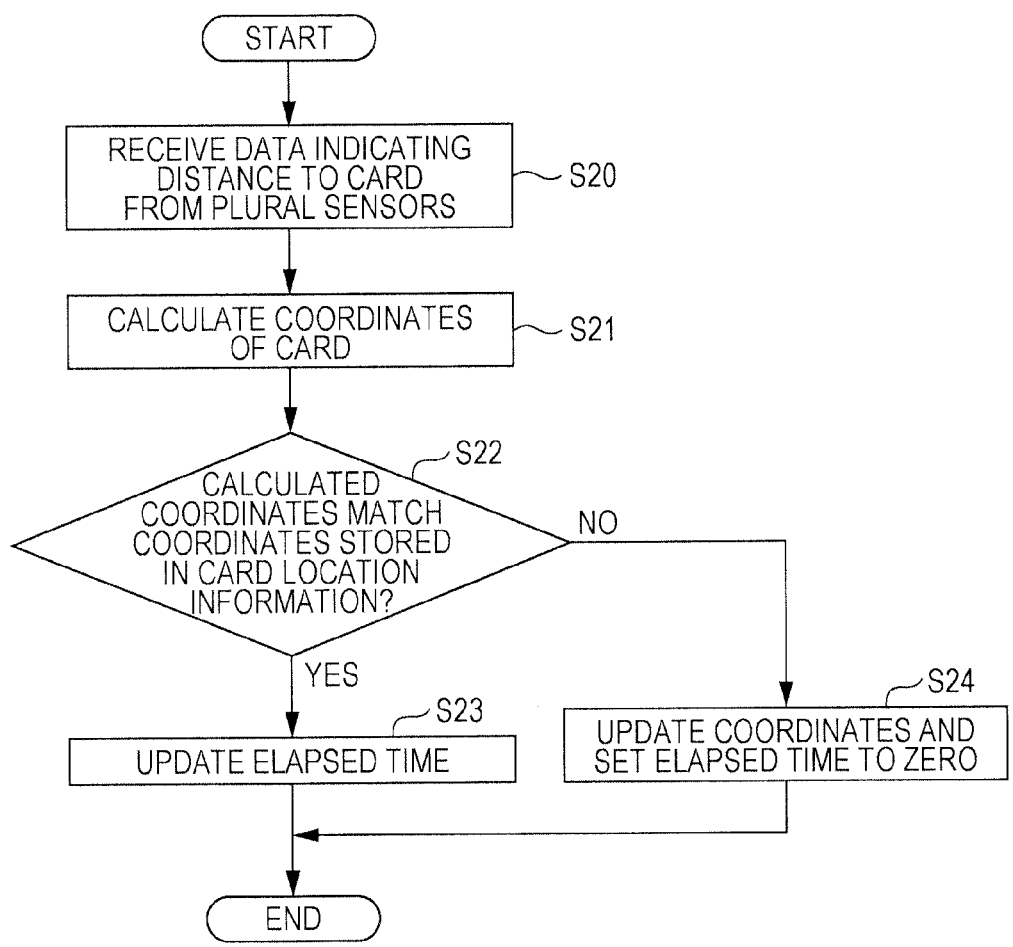
FIG. 9 is a flowchart showing an example of a card location calculation operation of the information processing server.

Now, a description will be given of an operation of calculating the card location information 113 of FIG. 5. FIG. 9 is a flowchart showing an example of a card location calculation operation of the information processing server 1. The operation described below is repeated at predetermined time intervals.

First, the card location calculating unit 101 receives data indicating the distances to the card 4 from the respective sensors 6a through 6c (S20), and calculates the position coordinates of the card 4 in the facility on the basis of the three distances (S21).

Then, the card location calculating unit 101 refers to the card location information 113 of FIG. 5, and determines whether the coordinates calculated in step S21 matches the coordinates stored in the card location information 113 (S22). If the two sets of coordinates match (S22; Yes), the card location calculating unit 101 updates the elapsed time of the card location information 113 by adding thereto the period of time that has elapsed from the last calculation (S23).

On the other hand, if the two sets of coordinates do not match (S22; No), the card location calculating unit 101 updates the values of the X-coordinate and the Y-coordinate of the card location information 113 to the calculated coordinate values, and sets the elapsed time to "0 sec" (S24). Here, "match" does not necessarily mean "perfectly match". For example, a difference ranging from a few centimeters to dozens of centimeters is not recognized as a substantial movement. Thus, even when there is such a degree of difference, the two sets of coordinates may be determined to match in step S22.

(4) Operations of Mobile Image Forming Apparatus)

In the above-described steps S5 and S9, the print document information 112 is transmitted from the print instructing unit 102 of the information processing server 1 to the mobile image forming apparatus 2. Then, the print instruction receiving unit 200 of the mobile image forming apparatus 2 stores the print document information 112 as the print document information 211 in the storage unit 21. Further, the card location information 113 is transmitted from the print instructing unit 102 of the information processing server 1 to the mobile image forming apparatus 2. Then, the route generating unit 201 having received the location information refers to the facility information 212, and generates route information 213 indicating a route for moving to the location of the card 4.

Then, the carriage controller 202 controls the carriage unit 24 to move to the location of the card 4 on the basis of the route information 213.

Then, the print controller 203 controls the print processing unit 23 to print the print document information 211, and provides the printed sheet to the user 7. Note that the print processing may be performed while the mobile image forming apparatus 2 is in motion, or may be performed after the mobile image forming apparatus 2 reached the location of the card 4.

Further, when printing is completed, the print controller 203 transmits information indicating a completion of printing to the information processing server 1.

(5) Print Request Information Operation

Subsequently, if the print instructing unit 102 of the information processing server 1 receives the information indicating a completion of printing from the mobile image forming apparatus 2 (S10; Yes), the print instructing unit 102 deletes from the storage unit 11 the print document information 112 that has been printed (S11). Then, the print instructing unit 102 deletes the print request of the job number 1 of the print request information 111 of FIG. 4 and decrements the job numbers so as to update the print request information 111 (S12).

Effects of Exemplary Embodiment

According to the exemplary embodiment described above, the print instructing unit 102 of the information processing server 1 refers to the card location information 113. If the card 4 is remaining in the same location for a period of time greater than a predetermined period of time, the print instructing unit 102 assumes that the user 7 of the card 4 is working in the location, transmits the location information to the mobile image forming apparatus 2, and instructs the mobile image forming apparatus 2 to perform printing. If the period of time for which the card 4 is remaining in the same location is less than the predetermined period of time, the print instructing unit 102 assumes that the user 7 is in motion, and does not instruct the mobile image forming apparatus 2 to perform printing. Accordingly, it is possible to track the user 7 carrying the card 4 as the source of the print request and to provide a printed material.

Other Exemplary Embodiments

The present invention is not limited to the above-described exemplary embodiment, and variations and modifications may be made without departing from the scope of the present invention. The prevent invention is applicable to apparatuses other than image forming apparatuses. For example, the present invention is applicable to various types of apparatuses that move to the location of the user in response to a request from the user, such as a robot that brings coffee to the user.

In the above-described exemplary embodiment, the function of each of the units 100 through 102 of the controller 10 and the function of each the units 200 through 203 of the controller 20 are implemented by a program, all or part of the function of each unit may be implemented by hardware such as ASIC. Further, the program used in the above exemplary embodiments may be stored and provided in a storage medium such as a CD-ROM. Further, the order of the steps described in the above exemplary embodiment may be rearranged; some steps may be removed; or additional steps may be added, without departing from the scope of the present invention.

What is claimed is:

1. An information processing apparatus comprising:
a processor configured to execute:
a receiving unit that receives a print request with respect to a mobile image forming apparatus from a request source;
a location calculating unit that calculates position coordinate information of the request source, and updates elapsed time information indicating a period of time the request source is at a location indicated by the position coordinate information; and
an instructing unit that instructs the mobile image forming apparatus to move to the request source of the print request and perform printing if the instructing unit determines that the request source is not in motion based on the position coordinate information and the elapsed time information,
wherein if the at least one processor determines that the request source is in motion, the instructing unit instructs the mobile image forming apparatus to move to another request source of another print request and perform printing if the at least one processor determines that the other request source is not in motion, on the basis of a temporal change of location information indicating a location of the other request source.

2. The information processing apparatus according to claim 1, wherein the delays instructing the mobile image forming apparatus to move to the request source if the instructing unit determines that the request source is in motion, on the basis of the temporal change of the location information.

3. The information processing apparatus according to claim 1, wherein the instructing unit determines that the request source is not in motion if the temporal change of the location information is in a predetermined range.

4. The information processing apparatus according to claim 1, wherein the instructing unit does not instruct the mobile image forming apparatus to move to the request source if a temporal change of the location indicated by the location information occurs in a predetermined area.

5. The information processing apparatus according to claim 1, wherein the at least one processor determines that the request source is not in motion when the elapsed time information associated with the position coordinate information of the request source is above a threshold value.

6. The information processing apparatus according to claim 1, wherein the instructing unit instructs the mobile image forming apparatus to perform printing while the mobile image forming apparatus is in motion.

* * * * *